Patented Feb. 13, 1923.

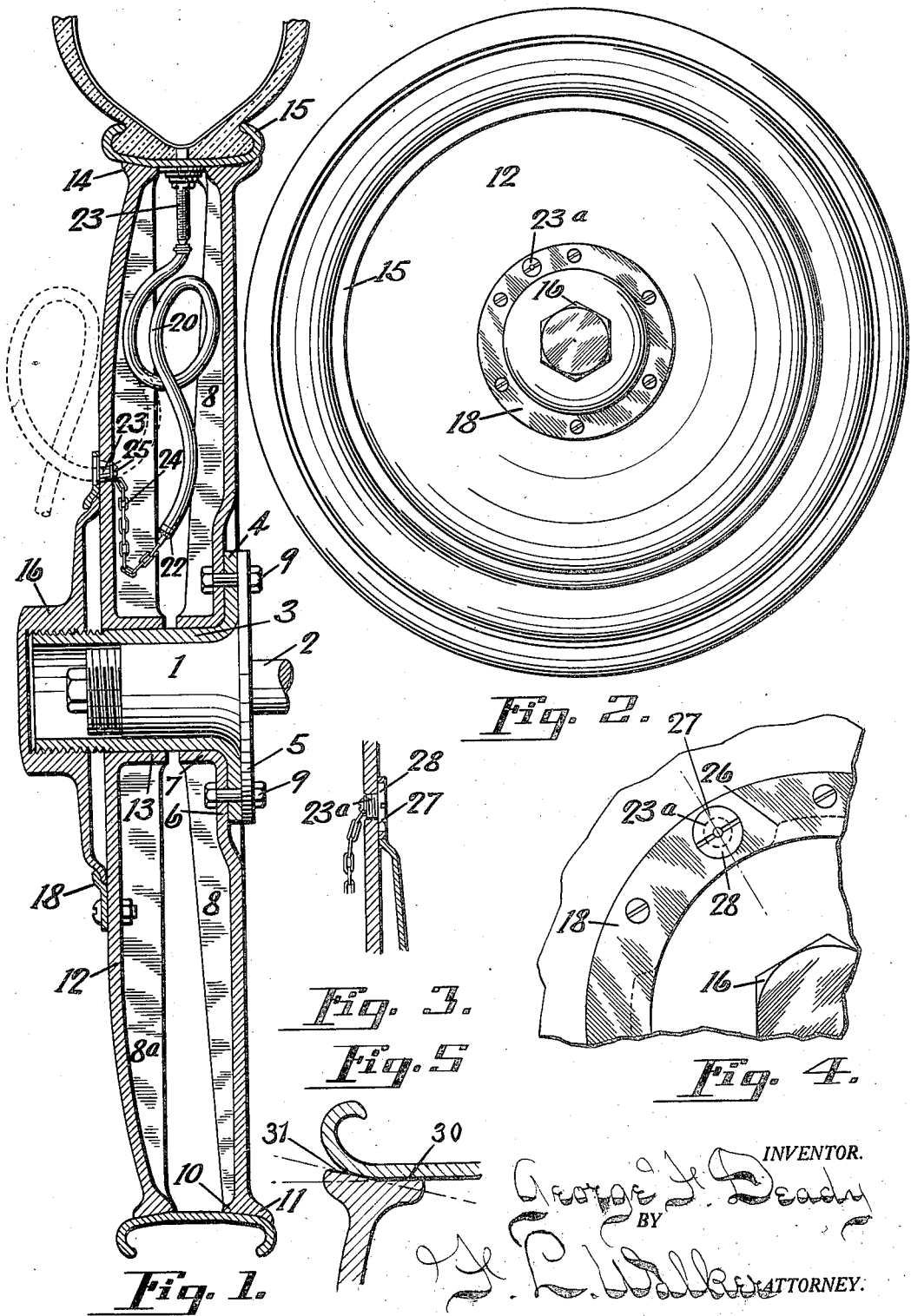

1,445,008

UNITED STATES PATENT OFFICE.

GEORGE F. DEADY, OF DAYTON, OHIO, ASSIGNOR, BY DIRECT AND MESNE ASSIGN-MENTS, TO THE DAYTON DISC WHEEL COMPANY, OF DAYTON, OHIO, A CORPORATION OF OHIO.

VEHICLE WHEEL.

Application filed May 7, 1921. Serial No. 467,774.

*To all whom it may concern:*

Be it known that I, GEORGE F. DEADY, a citizen of the United States, residing at Dayton, in the county of Montgomery and State of Ohio, have invented certain new and useful Improvements in Vehicle Wheels, of which the following is a specification.

My invention relates to vehicle wheels and more particularly to wheels of the disc or continuous web type, particularly adapted for motor vehicles.

The object of the invention is to simplify the structure as well as the means and mode of applying such wheels and engaging demountable rims thereon, whereby they will not only be cheapened in construction, but will be more efficient in use, positive in operation, of increased durability, and maximum safety and unlikely to get out of repair.

A further object of the invention is to provide improved means for detachably engaging the demountable rim upon the web or disc of the wheel, and to provide means for tightening the rim thereon, and for disengaging the rim and disc by the rotation of the hub cap.

A further object of the invention is to provide a disc or web wheel of light but strong and durable construction, which will be readily applicable to vehicles by employing the original wheel hub designed for wooden spokes and substituting for such wooden spokes metallic discs or webs and securing the same to the original wheel hub.

One of the objectionable features of the present disc type of wheels for motor vehicles, is the difficulty encountered in inflating the tire. To overcome such objectionable features, is one of the primary objects of the present invention to which end means is provided for withdrawing at will thru a normally closed opening in the web of the wheel, a conduit or tube connected to the inflation valve of the tire, which communicating conduit at other times will be enclosed and concealed within the wheel structure.

A further object of the invention is to provide easy operable means not only for drawing the disc of the wheel into uniform bearing or engagement with the demountable rim, but for also forceably disengaging the disc and rim and withdrawing them one from the other with minimum effort upon the part of the operator and the disengagement of a minimum number of parts.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Fig. 1 is a vertical sectional view of the assembled wheel forming the subject matter hereof. Fig. 2 is a front elevation of the wheel upon a scale somewhat reduced from that of Fig. 1. Figs. 3 and 4 are detail views illustrating a method of locking the hub cap against rotation.

Like parts are indicated by similar characters of reference thruout the several views.

Referring to the accompanying drawings, wherein is illustrated the preferred, but not necessarily the only embodiment of the invention, 1 is a standard motor vehicle hub and 2 the axle, as at present employed in motor vehicles. In the original construction for which the hub 1 was designed, a series of radially disposed wood spokes were bolted to the hub flange in the position occupied by the disc or web hereafter described. Mounted upon the standard wheel hub 1 is a flanged sleeve or auxiliary hub 3, the interior bore of which conforms quite closely to the peripheral surface of the hub 1, and the flange 4 of which abuts upon the hub flange 5. Slidingly mounted upon this auxiliary hub or sleeve 3 and abutting upon the outer face of the sleeve flange 4 is a circular supporting disc or web 6, having at its center an opening surrounded by a flange 7 which conforms to the exterior of the auxiliary hub or sleeve 3. This web or disc 6 is preferably though not necessarily strengthened by radially disposed ribs 8. The hub 1, auxiliary hub 3 and the disc 6 which comprise the inner face of the wheel, are fixedly yet detachably interconnected by bolts or studs 9 thru the flanges 4 and 5 of the auxiliary hub or sleeve and the standard wheel hub and also thru the web 6. By this means, the web 6 is connected for rotation in unison with the hub. The outer periphery of the disc or web 6 is enlarged to afford marginal flanges or beads 10, and 11, the latter of which is somewhat outturned and the peripheral faces of the beads 10 and 11 are contoured to agree with the bottom and lateral face of the demountable tire rim hereafter referred to. Slidingly adjusted upon the auxiliary hub or sleeve 3 in a plane parallel with that of the disc or web 6 is a second disc or web 12, likewise having a central opening surrounded by a flange 13, conforming to the exterior diameter of the sleeve or auxiliary hub 3, the face of this disc or web 12 may be given any desired ornamental configuration for ornamental purposes. That is to say, it may be provided with a series of concentric grooves or beads or radially disposed ribs or depressions or ornamental figures may be traced in any manner thereupon. In the drawing no attempt has been made at ornamentation, and the disc or web 12 has been shown as of a simple, plain convex form. This web 12 like the innermost web 6 may if desired be reinforced by radially disposed ribs 8ª or by suitable corrugations therein, the outer periphery of this disc or web 12 is likewise formed with a marginal flange or bead 14, the outer face of which is beveled inwardly and rearwardly in relation with the plane of the wheel. The angularity of the beveled periphery of the disc or web is comparatively slight. In practice a bevel of substantially five degrees has been found to be sufficient, although a bevel of greater angularity is not objectionable, and for certain conditions of use it may indeed be quite desirable. The essential feature is that this angularity or bevel of the periphery of the disc or web which agrees with a like bevel or inclined surface formed upon the inner periphery of the tire rim 15 shall be such as to effect a firm, marked wedging or binding action, when the beveled disc is drawn within the bevel of the rim. The web or disc 11 is slidingly adjustable upon both the sleeve or auxiliary hub 3, to and from the inner disc or web 6. It is forceably drawn inward with a wedging effect upon the demountable rim 15 by means of a flanged hub cap 16, screw threaded upon the extremity of the auxiliary hub or sleeve 3. The tire rim 15 of standard construction as now commonly employed upon motor vehicles, usually does not possess an exactly flat or cylindrical inner surface, but is slightly inclined or tapered sufficient to coact with the inclination or bevel of the adjustable web 12. However a bevel formed upon the inner circumference of the rim having an angularity agreeing with that of the periphery of the disc is to be preferred.

As shown particularly in Fig. 1 of the drawing, the periphery or marginal flange of the hub cap 16 is engaged beneath an overlying gib or retaining ring 18, fixedly secured to the face of the disc or web 12. This construction permits the hub cap 16 to rotate freely in relation with the disc and beneath the overhanging retaining ring 18, but prevents its disengagement from the disc. The demountable rim 13 is positioned about the periphery of the webs 6 and 12, while the webs are in a distended or abnormally separated relation. By the rotation of the hub cap 16 which has screw threaded engagement with the auxiliary hub 3, the outermost web or disc 12 is pressed inwardly toward the inner disc or web, thereby exerting a camming or wiping action, upon the inner beveled face of the surrounding tire rim 15 causing the discs and rim to firmly seat one upon the other. The tapered or slightly divergent shape of the engaging faces of the rim and disc 12 and the corresponding engaging features of the rim and disc 6, the projecting flange 11 of which conforms to the contour of the rim and prevents the rim from being laterally displaced while in use.

While the web and rim may be caused to engage with extreme pressure by the adjustment of the hub cap 16, in one direction, a reversal of the rotation of the hub cap will equally and effectively withdraw the web 12 from engagement with the rim 15. That is to say, the unscrewing of the hub cap from the auxiliary hub 3, acts as an extractor, exerting a pulling action upon the disc thru the retaining ring 18, by which the disc is drawn forceably outwardly and away from the web 6, thereby releasing the camming engagement of its periphery with the bevel of the rim. Thus the hub cap is effective in both directions of rotation, operating in one direction to secure the engagement of the rim and disc and in the other direction to disengage said part.

As heretofore constructed, the difficulty encountered inflating the tire to a very considerable extent counteracted the advantages of the disc type of wheel. The disc type of automobile wheels now in common use embody merely a face disc, which is only a mask to give the appearance of a solid wheel. The inflation of the tires is effected wholly in the rear of this disc. This renders the tire stem somewhat difficult of access. To increase the accessibility of the tire stem, in the present instance, there has been provided intermediate the discs 6 and 12 a flexible tubular conduit 20, one end of which is permanently connected with the usual valve stem 21, while the inner end is flexibly connected with a removable plug 23, screw threaded or otherwise engaged in an opening in the disc 12. In the present instance, the conduit 20 has been shown with a removable screw threaded cap 22, such as is ordinarily applied to the open end of a valve stem, to which is connected a short length of chain, 24, having a swivel connection at 25 with the removable plug 23. By disengaging the plug 23 from the access opening, the tube 20 may be withdrawn by means of the chain 25 thru such opening as shown by dotted lines, to permit the attachment of the air supply conduit thereto. After the tire is fully charged the conduit 20 is returned into its normal position intermediate the disc and the closure plug 23 restored. The tire stem and hose connection 20 are thus protected against injury and against the accumulation of mud, dust or foreign material, yet are readily accessible from the face of the wheel, and in a position really more convenient than the ordinary valve stem connection upon the wheel felloe.

It has been found that under ordinary conditions of use, the bending or wedging of the disc 12 within the rim and the frictional engagement of the tire hub with the disc and with the auxiliary hub 3 is sufficient to hold the hub cap against reverse or unlocking rotation under the influence of vibration, when traveling. In Figs. 3 and 4 there has been shown a very simple and convenient form of locking means. In this construction the marginal ring of the hub cap 16 projecting beneath the retaining ring 18 has been shown notched or cut away thruout somewhat extended sectors as shown by dotted lines at 26. There may be about the periphery of the hub any desired number of these notches or recesses affording intervening teeth or projections which engage beneath the overhanging ring 18, as shown in Fig. 2. The access opening to the interior of the wheel for inflation purposes, is located in close proximity to but beyond the path of travel of these projecting lugs or teeth, upon the periphery of the hub cap as indicated by dotted lines at 27 Fig. 3. The closure plug 23ª in Fig. 2 is provided with an enlarged head as at 28, which head overhangs the access opening sufficient to extend within the path of travel of the lugs or teeth, or otherwise unrecessed portion of the hub cap periphery. This construction is such that the projecting head 28 of the closure plug 23ª will form a stop for the hub cap, and prevent its rotation in either direction until the closure plug for the access opening has been removed. This closure plug is thus made to serve a double purpose and the wheel is locked against accidental disengagement of the parts.

In Fig. 4 there is shown an enlarged detail of the engaging portions of the adjustable disc and rim. This is the preferred form of the marginal surfaces of the adjustable disc 12. As shown in Fig. 4 the marginal surfaces of the adjustable disc 12 comprises an inner cylindrical portion 30 and an outwardly tapered or conical portion 31, intersecting the cylindrical portion. The inner cylindrical portion which is substantially parallel with the axis of the wall, serves as a pilot guide in adjusting the disc, while the inclined face 31 affords a wedging action upon the curved edges of the rim.

From the above description it will be apparent that there is thus provided a device of the character described, possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described the invention, I claim:

1. In a vehicle wheel, an annular rim, a hub, a disc carried by the hub and surrounded by said rim, a pneumatic tire upon the rim, an inflation stem for said tire extending thru the rim, a flexible tube connected therewith, an access opening in the disc thru which the flexible tube may be drawn, and a detachable closure for the opening connected with the flexible tube.

2. The combination with a disc wheel having a pneumatic tire, of a flexible inflation conduit communicating with the pneumatic tire, the wheel disc having an access opening therein thru which the inflation conduit may be drawn for attachment to an air supply conduit.

3. The combination with a disc wheel having a pneumatic tire, of a flexible inflation tube connected therewith, the disc of the wheel having an access opening therein, a detachable closure for the access opening, and a connection between the closure and the flexible tube.

4. The combination of a hub, a pair of spaced discs carried thereby, a rim carried by the discs, a pneumatic tire carried by the rim, and a flexible inflation tube communicating with the pneumatic tire and interposed between the discs, and an access opening in one of the discs thru which the tube may be extended for connection with an air supply conduit.

5. The combination with a disc wheel, of a pneumatic tire carried thereby, a movable inflation conduit communicating with the tire and engageable with an air supply conduit thru the disc at a point in proximity to the hub of the wheel and means operable from the exterior of the disc for drawing the inflation conduit to position for engagement with the air supply conduit.

6. The combination with a disc and a pneumatic tire carried thereby, of a flexible inflation conduit for said tire, the wheel disc having an opening therein, through which the conduit is projected for engagement with an air supply conduit, a closure for said opening, and an actuating connection between the closure and conduit by which the conduit is moved to position for connection with an air supply conduit upon removal of said closure.

In testimony whereof, I have hereunto set my hand this 13th day of April, A. D. 1921.

GEORGE F. DEADY.

Witnesses:
 HARRY F. NOLAN,
 GEORGE C. HELWIG.